Fig. 1

INVENTORS
Clifford H. Wurtz
Leonard J. Mann
By R R Cauder
Their Attorney

INVENTORS
Clifford H. Wurtz
Leonard J. Mann
By P.R.Caudor
Their Attorney

INVENTORS
Clifford H. Wurtz
Leonard J. Mann
By R R Cauder
Their Attorney

INVENTORS
Clifford H. Wurtz
Leonard J. Mann
Their Attorney

United States Patent Office 2,900,806
Patented Aug. 25, 1959

2,900,806

SELF-DEFROSTING TWO-TEMPERATURE REFRIGERATOR

Clifford H. Wurtz and Leonard J. Mann, Dayton, Ohio, assignors to General Motors Corporation, Detroit, Mich., a corporation of Delaware Application December 27, 1955, Serial No. 555,333

21 Claims. (Cl. 62—186)

This invention is directed to a refrigerator having a freezing compartment and an above freezing or higher temperature refrigerating compartment in which refrigerator no frost is deposited in either compartment.

An object of this invention is to provide a refrigerator having a freezing compartment and a higher temperature refrigerating compartment so arranged that frost is not deposited within either of the compartments.

Another object of this invention is to provide a refrigerator in which a first liner forms a below 32° F. refrigerating compartment and a second liner forms an above 32° F. refrigerating compartment and in which a casing surrounds a major portion of the first liner and forms an air flow and air cooling passageway around the liner in which cold dehydrated air is circulated to cool the liner and from which passageway the cool dehydrated air is circulated into the below 32° F. refrigerating compartment in such a manner that no frost is deposited within the compartment, and from which compartment the dehydrated air removes or sublimates any frost which might be introduced on prefrozen food or the like. This circulation is maintained while proper refrigerating temperatures are simultaneously maintained in the above 32° F. refrigerating compartment.

Further objects and advantages of the present invention will be apparent from the following description, reference being had to the accompanying drawings wherein a preferred embodiment of the present invention is clearly shown.

Figures 10, 11:
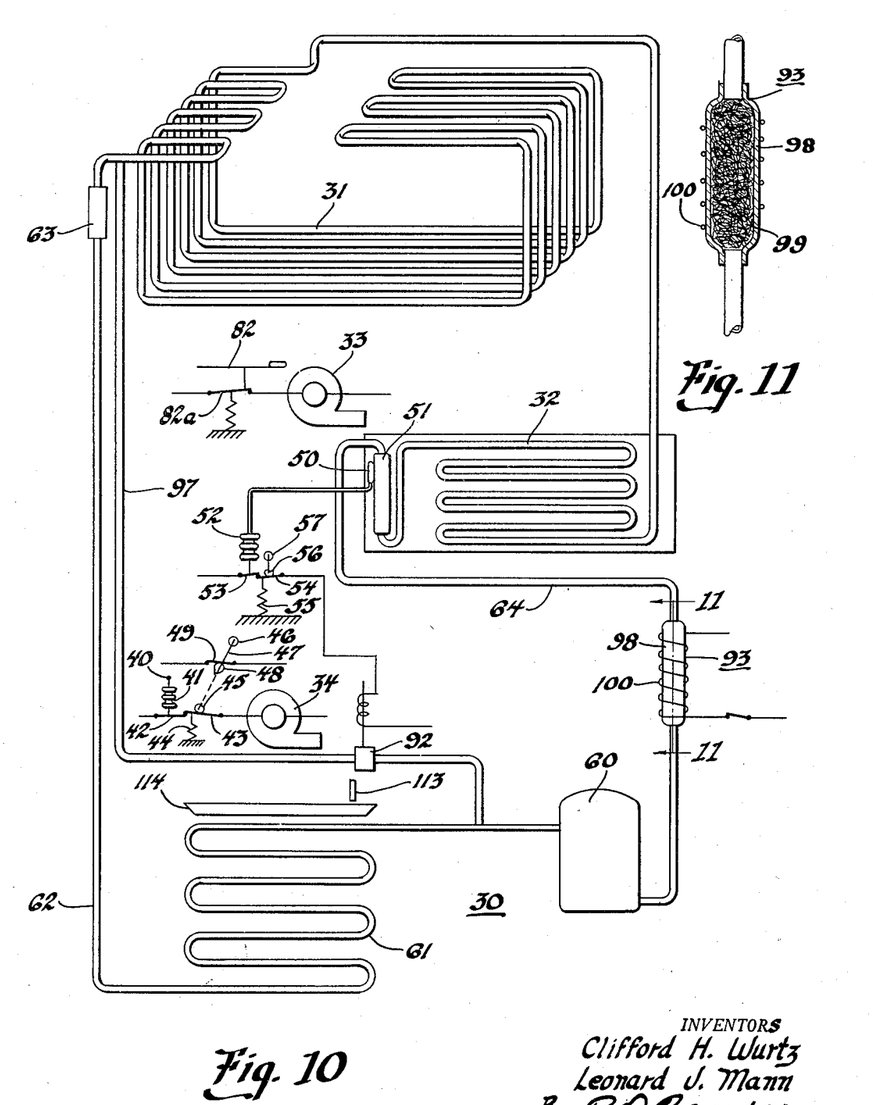
Figure 10 is a diagrammatic representation of the refrigerating system and parts attached thereto.
Figure 11 is a cross-section taken along the line 11—11 of Figure 10.

An insulated refrigerator 20 has a first compartment 21 to be maintained at a temperature below 32° F. and a second compartment 22, to be maintained at a refrigerating temperature above 32° F., such as from 33° F. to 44° F. A casing 23 surrounds the major portion of the first compartment 21 and has an air inlet means in the form of inlets 24 into said compartment 21 and has an air outlet means in the form of outlets 25 from said first compartment 21 into the space 124 surrounding the compartment. A refrigerating system (Figure 10) includes the refrigerant liquefier 30 and a refrigerant evaporator, one potion 31 being adjacent to, or in thermal contact with casing 23, and cools compartment 21, while another portion 32 of the evaporator is relatively remote from the casing 23 and cools the compartment 22. A first fan 33 is provided for circulating air from said air outlets 25, past or in thermal contact with said one portion 31 of the evaporator, through said air inlets 24 into said first compartment 21, and again into said air outlets 25 for recirculation by said first fan 33. A second fan 34 is provided for recirculating air back and forth between the second compartment 22 and said other portion 32 of the evaporator.

The foregoing construction is such that the evaporator portions 31 and 32 are the coldest parts of the refrigerator and therefore all of the frost which is deposited during the normal refrigeration cycle is deposited on these portions 31 and 32 and the compartments 21 and 22 are therefore always maintained in a frost-free condition. No frost is ever deposited within the compartments 21 and 22 or on the food contained in the compartments.

Figure 12:
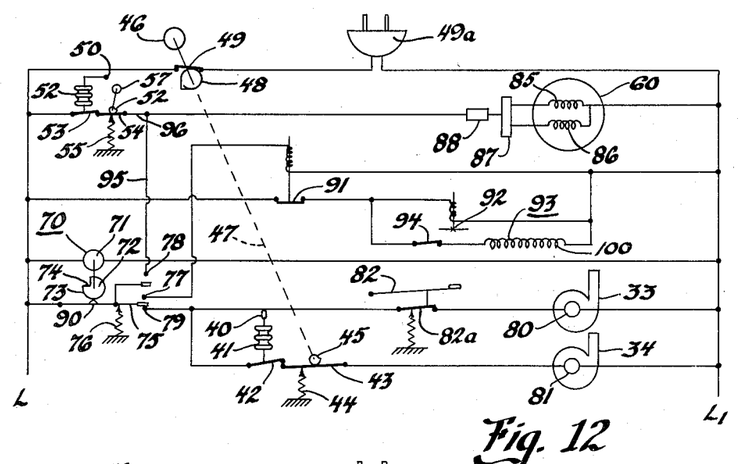
Figure 12 is a wiring diagram for the controls of the refrigerator shown in Figures 1 through 11.

The second compartment 22 and the portion 32 of the evaporator are in thermal exchange with each other independently of the recirculation of air by the first fan 33. This is accomplished by providing a thermostatic bulb 40 within or in thermal contact with the compartment 22, which automatically governs the operation of the fan 34 in response to temperatures within the compartment 22. To this end, the bulb 40 actuates the bellows 41 (Figure 12), which opens and closes the switch 42 when the temperature in compartment 22 falls and rises, respectively, beyond the predetermined or selected temperature limits. Temperatures at which the switch 42 opens and closes may be adjusted by movement of the upwardly biased blade 43, which is biased by the compression spring 44 against an adjustable cam 45, which is adjusted by the knob 46 acting through the shaft 47. The knob 46 may be placed in any conveniently accessible location. The shaft 47, if desired, also actuates the cam 48 which opens and closes the master switch 49 which controls the operation of the entire refrigerator by opening and closing one or both lines leading from the connector plug 49a. When the knob 46 is turned to various selected on positions, the compartment 22 is maintained at various refrigerating temperatures above 32° F. but generally below 40° or 50° F. Such selection is accomplished by the adjustment of cam 45 and hence the position of the blade 43 with respect to the switch 42, thus determining the opening and closing temperature of the switch 42 and hence the temperature of the compartment 22. Such adjustment is independent of the temperature selected to be maintained in compartment 21.

Means are provided for maintaining the temperature of the refrigerant in the portion 31 and, if desired, also in the portion 32 of the evaporator between predetermined below 32° F. limits during the refrigerating period. To this end, a thermostatic bulb 50 (Figure 10) is placed in thermal exchange with the accumulator 51 for any other desired part of the evaporator. The bulb 50 is connected to the bellows 52 which actuates the switch 53 in response to temperatures of the refrigerant within the evaporator. The temperature at which the switch 53 opens may be adjustable by adjustment of the blade 54 which is upwardly biased by the spring 55 against the cam 56 which is adjustably actuated by the knob 57 located at any accessible location. Adjustment of the knob 57, and of the blade 54, in turn adjusts the temperature at which the switch 53 opens and closes, and hence determines the temperature below 32° F., which is to be maintained within the evaporator portions 31 and 32. This indirectly determines the temperature of the compartment 21, and its temperature can thus be adjusted to any desired temperature, within operating limits, independently of the temperature of compartment 22.

Means are provided for periodically and automatically defrosting the portions 31 and 32 of the evaporator without the necessity of disturbing or defrosting the food within the compartments 21 and 22. To this end, the evaporator portions 31 and 32 are heated while the fans 33 and 34 are stopped, and the water so produced is evaporated by heat from the condensing unit. For example, the refrigerant liquefier 30 (Figure 10) may include a motor compressor unit 60 and a refrigerant condenser 61 in refrigerant flow relationship with the evaporator portions 31 and 32 through the liquid lines 62 and expansion valve or capillary tube 63, the evaporator refrigerant returning through the line 64 to the motor compressor unit 60.

The timer 70 automatically defrosts the portions 31 and 32 by stopping the regular refrigeration cycle and temporarily establishing a defrosting cycle during which heat is introduced into the portions 31 and 32 to defrost them. For example, the timer motor 71 drives a cam 72 provided with a refrigeration surface 73 and a defrosting notch 74. During the refrigeration cycle, the blade 75 is in the down position to close on contact 79, whereas during the defrosting period, the blade 75 is upwardly urged by the spring 76 to an upper position whereby the contacts 77 and 78 are energized and contact 79 is deenergized. During the refrigeration period, the energized contact 79 energizes the motor blowers 80 and 81 driving the blowers 33 and 34 respectively, as long as the door 82 and door switch 82a of the compartment 21 are closed. At the same time, the motor compressor unit 60, having main and starting windings 85 and 86 is cycled on and off by means of the thermostatic switch 53, to maintain the refrigerant in portions 31 and 32 within selected predetermined limits below 32° F. The unit 60 may be provided with starting relay 87 and motor protector 88 of the usual type. In this manner, the evaporator portions 31 and 32 are maintained at predetermined below 32° F. temperatures such as minus 10° to 20° F. throughout the refrigeration cycle. The substantially constant operation of the blower 33 maintains the compartment 21 at a below freezing temperature, while the automatically cycled blower 34 maintains the compartment 22 at a selected above 32° temperature determined by the position of the knob 46 and cam 45, and adjustment of switch 42 as previously described. Since the portions 31 and 32 are the coldest surfaces within the refrigerator, all frost accumulates on them during the refrigeration cycle and the air circulated from them never deposits frost on the food or within the inner surfaces of the compartments 22 and 21. Once a day, or at any other desired interval of time, the timer 70 moves the cam 72, so that the notch is opposite the surface 90 of the blade 75, and the blade 75 moves to its upper position to close upon contacts 77 and 78 to open contact 79. This action deenergizes the motors 80 and 81 and hence the blowers 33 and 34. At the same time, the solenoid switch 91 is energized and closed, which in turn energizes the solenoid valve 92 and the heater 93 which is energized through the medium of the generally closed manual switch 94. The motor compressor 60 continues to operate either or both from the lines 95 or 96. Under these conditions, the compressor circulates hot refrigerant through the line 97 to the evaporator portions 31 and 32, the refrigerant returning through the line 64 and the heater 93, which introduces refrigerant in a heated condition back to the motor compressor 60.

The heater 93 may take the form of an enlarged casing 98 surrounding a heat exchange medium such as metal wool 99. An electric heater 100 surrounds the casing 98 which imparts heat to the casing 98 and the heat exchange medium 99 to heat the returning refrigerant sufficiently to impart the necessary heat to the refrigerant which is fed to the portions 31 and 32 through the line 97.

The water formed by the melting frost from the evaporator portion 31 flows into a trough 105 formed in the bottom of the casing 23 and is fed by the spout 106 against the back wall 107 of the liner 108 which forms part of the compartment 22. The water formed by the frost melting from the portion 32 flows along the back wall 107 and also along the walls 109 and 141 and finds its way through an opening 111 to a trough 112 at the bottom of compartment 22. From there it flows through the pipe 113 into the pan 114 located above the condenser 61 and is heated thereby to evaporate the water from the melted frost.

Figure 1:
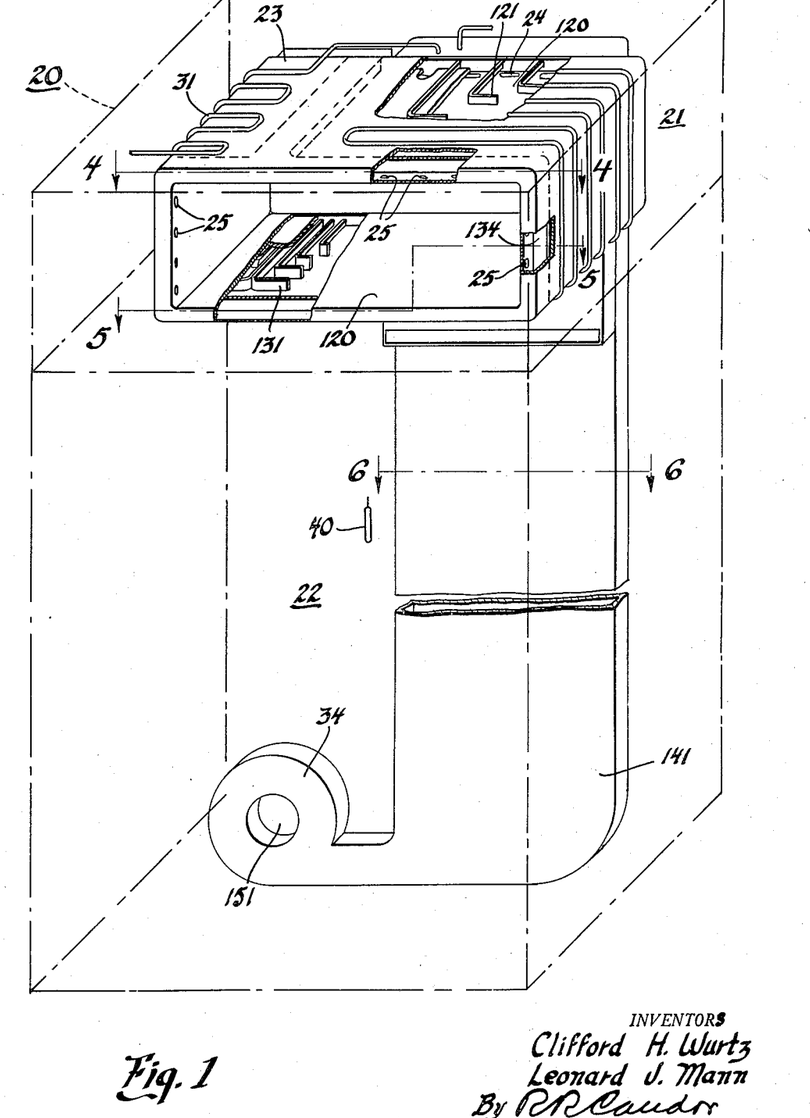
Figure 1 is a view in perspective showing the air refrigerating means and the refrigerator compartments of the refrigerator in phantom view.
Figure 2:
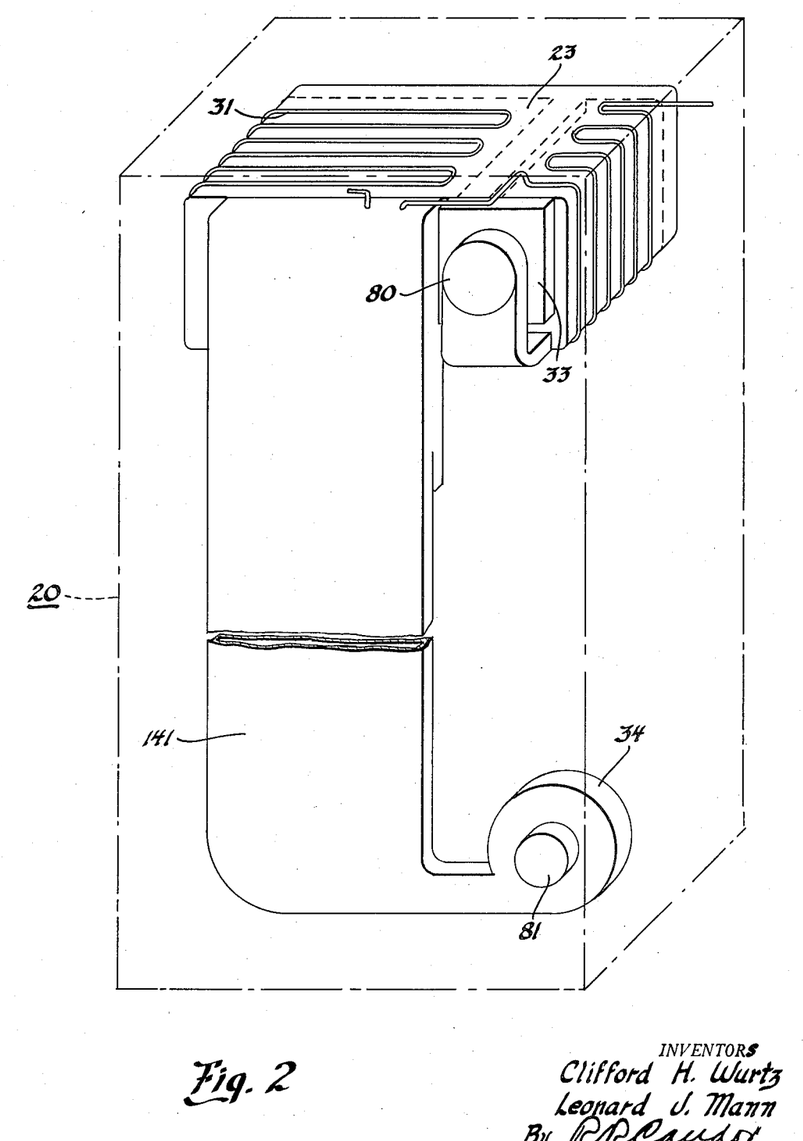
Figure 2 is a view somewhat similar to Figure 1, but showing the refrigerator from the rear.
Figure 3:
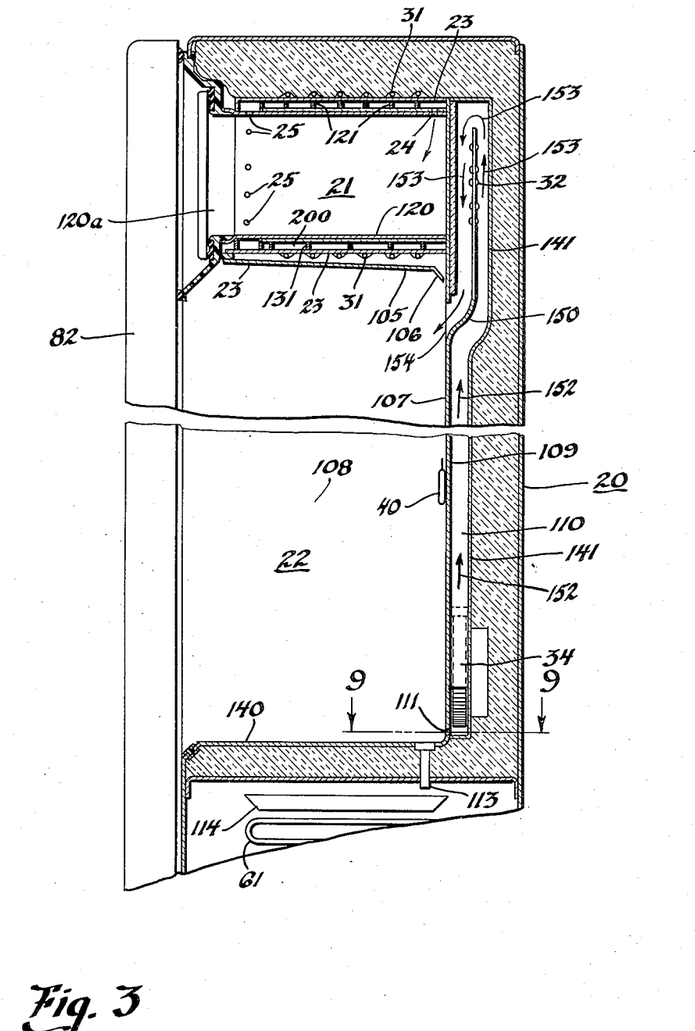
Figure 3 is a vertical cross-section of the refrigerator.
Figure 4:
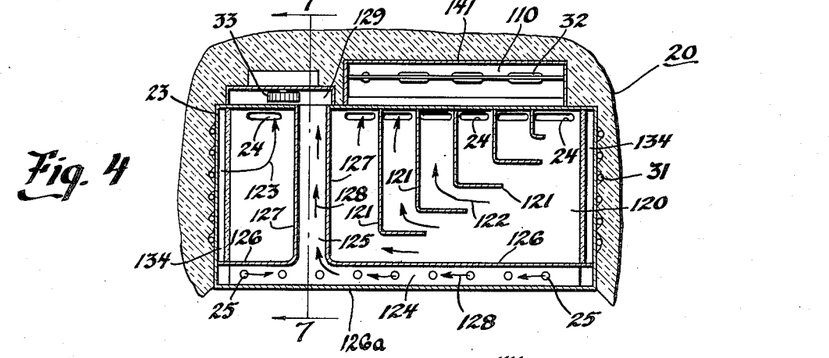
Figure 4 is a horizontal cross-section taken along the line 4—4 of Figure 1.

Preferably the compartment 21 is formed by a first liner 120 in which the inlets 24 and the outlets 25 are formed. The casing 22 surrounds the liner 120 along the top, sides and bottom walls. The top of the liner 120 is provided with baffles 121 (Figures 3 and 4) which are adapted to receive the air flowing up through channels 134 along the sides of the liner 120 and to guide the air, as indicated by arrows 122, into the inlets 24 for delivering air into the compartment 21. Air rising from the left-hand side of the liner 120, as shown in Figure 4, flows as indicated by the arrow 123 into the inlet 24, and no baffle is required on this side.

A return flow air channel 124 is formed on the sides, bottom and top of the liner 120 by means of the wall 126 and 127, air flange 126a so that air flowing out of the compartment 21 through outlets 25 may flow, as indicated by arrows 128, back to the inlet 129 of the fan or blower 33. The wall 126 or 127 preferably extends outwardly from the liner 120 to the casing 23 to prevent air from flowing from one side of walls 126 and 127 to the other.

Figure 5:
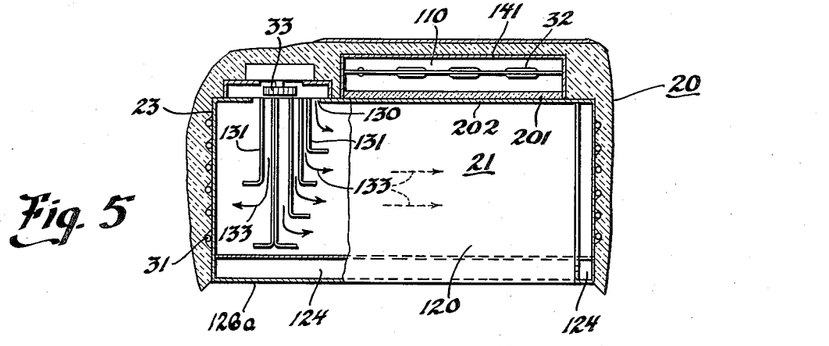
Figure 5 is a horizontal cross-section taken along the line 5—5 of Figure 1.
Figure 6:
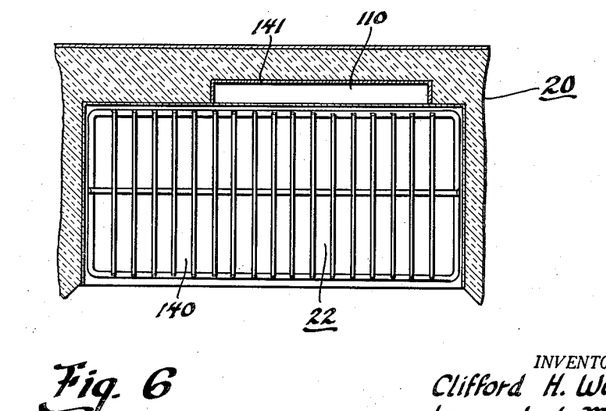
Figure 6 is a horizontal cross-section taken along the line 6—6 of Figure 1.
Figure 7:
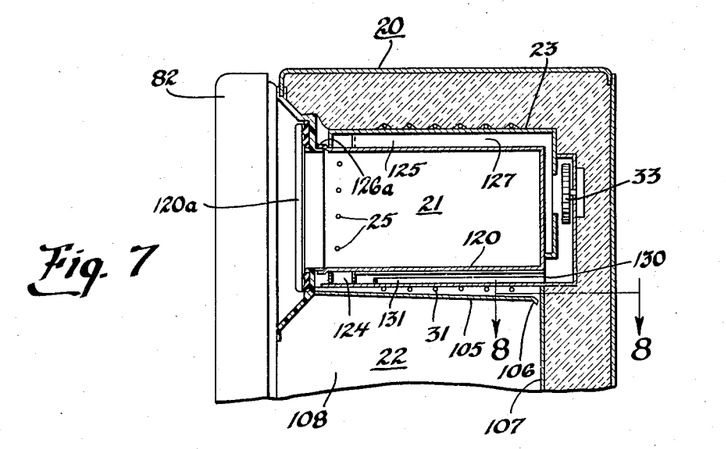
Figure 7 is a vertical cross-section taken along the line 7—7 of Figure 4.
Figure 8:
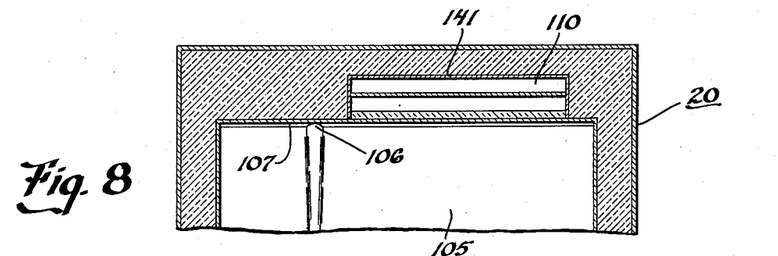
Figure 8 is a horizontal cross-section taken along the line 8—8 of Figure 7.
Figure 9:
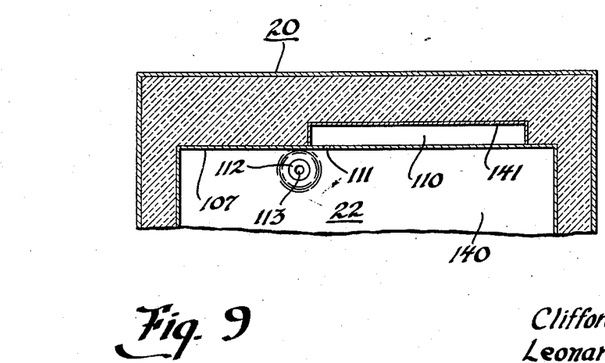
Figure 9 is a horizontal cross-section taken along the line 9—9 of Figure 3, to show the flow of water from melted frost.

Air discharged by the fan 33 through the outlet 130 may be distributed by baffles 131 (Figures 5 and 7) sideways into the bottom channel below the lining 120 as indicated by arrows 133 (Figure 5) so that the air can flow laterally along the outside of liner and then upwardly along the channels 134 to be returned as indicated by the arrows 122 and 123 into the compartment 21 through the air inlets 24.

The compartment 22 may be formed by a second liner including the side walls 108, previously referred to, and the back wall 109, previously referred to, and the bottom wall 140. A casing 141 cooperates with said last named liner forming an upward air flow passageway 110 near said liner. The passageway 110 has a curving wall 150 which supports the evaporator portion 32. The fan 34 has an air intake 151 from compartment 22 and discharges the air upwardly through passageway 110, as indicated by arrows 152, into contact with evaporator portion 32, as indicated by arrows 153, and thence, in a cooled condition, through opening 154 back into compartment 22. The action of bulk 40 and switch 42 regulates the operation of fan 34 to maintain the temperature of compartment 22 at a selected temperature above 32° F. refrigerating temperature.

Figure 13:
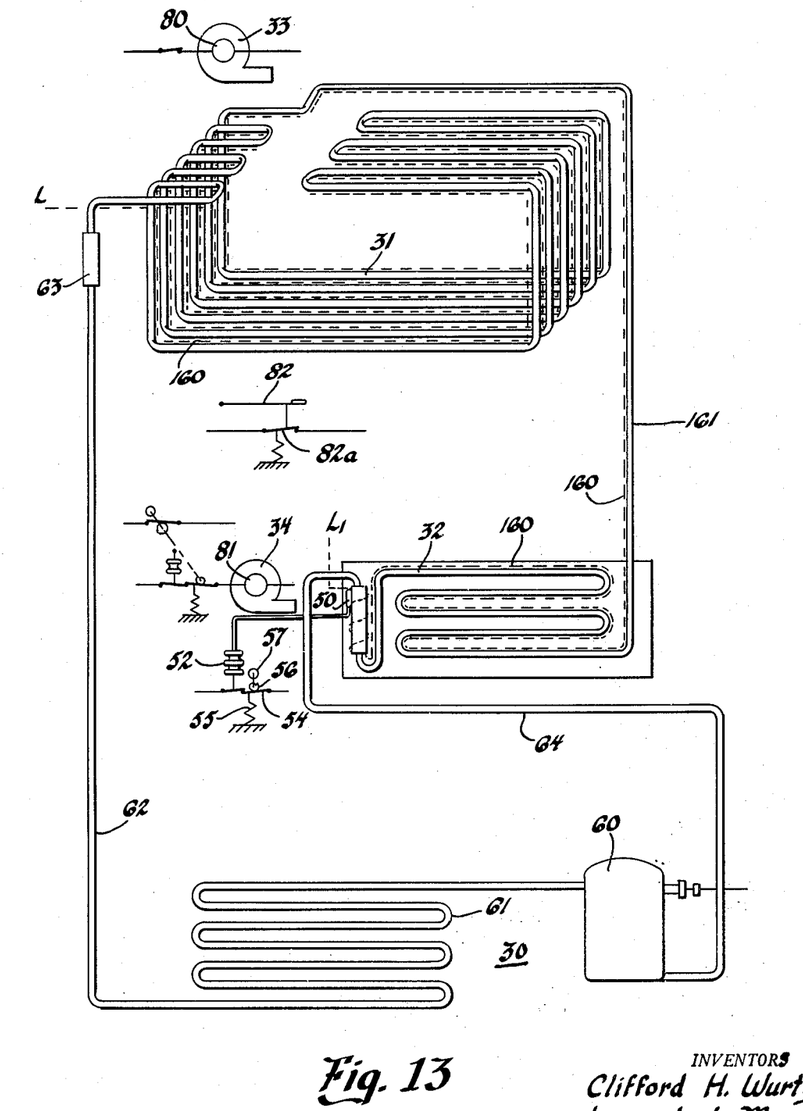
Figure 13 is a view similar to Figure 10, but showing a direct contact electrically defrosted refrigerating system.
Figure 14:
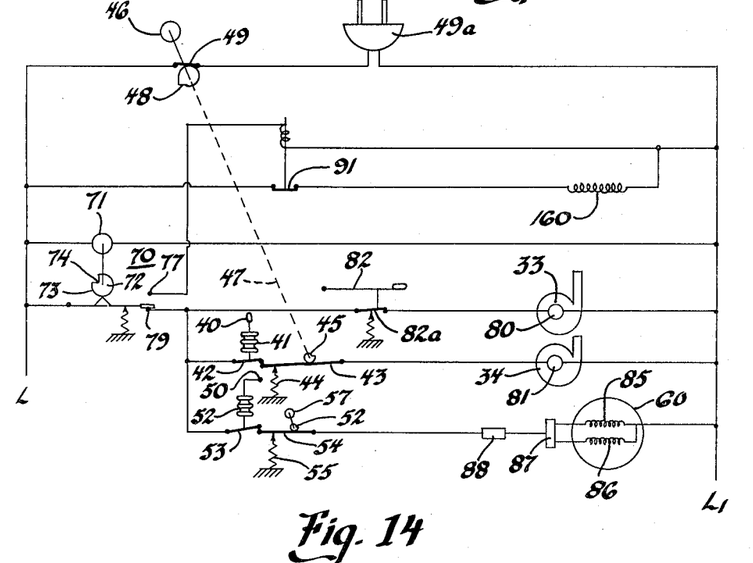
Figure 14 is a wiring diagram for the controls of the system shown in Figure 13.

In the modification shown in Figures 13 and 14 many of the elements are substantially the same as in the embodiment of Figures 1–12, and hence, wherever possible the same reference numerals have been applied. Such elements have substantially the same construction and functional operation as in the previous embodiment. The main difference is in the application of heat for defrosting purposes.

The defrosting heat in Figures 13 and 14 is applied by an electrically insulated resistance heater 160 indicated by a dotted line. This heater is placed in direct thermal exchange with the evaporator portions 31 and 32 and, if desired, also with the refrigerant line 161 which connects the two evaporator portions. The heater 160 is electrically energized during the defrost period under the control of timer 70 as shown in the wiring diagram in Figure 14. The compressor motor 60 is not energized during the defrost period, since it is not necessary to circulate hot refrigerant during defrost, as the electric heater is in direct contact with the evaporator portions. Hence the contact 78 of Figure 12 can be omitted.

In the operation of the embodiment of Figures 1-12, during the refrigeration cycle, contact 79 is energized to cause intermittent operation of fan 34 under the control of thermostatic switch 42 to maintain compartment 22 at the selected refrigerating temperature above 32° F. Constant operation of fan 33 is maintained, except when door 82 and switch 82a are opened. At the same time motor compressor 60 operates under the control of thermostatic switch 53 to maintain the refrigerant temperature in evaporator portions 31 and 32 at the selected below 32° F., sufficiently low to maintain the desired freezing temperature in compartment 21.

During the refrigeration cycle, the air circulated by fan 33 is forced out opening 130 (Figure 5) and is deflected by baffles 131 to circulate around the outside of liner 120, as indicated by arrows 133, up through passages 134, out along the upper outside of liner 120, as indicated by arrows 122 and 123. The air is cooled and dehydrated at this time by direct or indirect contact with the evaporator portion 31. The cooled and dehydrated air is then discharged through openings 24 into the freezing compartment 21, where it sublimates any frost that may be present, due to the fact that the air is raised slightly in temperature within the compartment 21, as by the heat leakage in through doors 82 and 120a, of well known construction.

During the refrigerating cycle, air circulated by the fan 34 leaves the compartment 22 through fan opening 151 and is forced up through passage 110 into thermal contact with evaporator portion 32, as indicated by arrows 153, and then is discharged back, in cooled condition, into compartment 22 through opening 154. The fan 34 is cycled intermittently under the control of thermostatic switch 42 to maintain the compartment 22 at the selected refrigerating temperature above 32° F.

During defrost, the timer notch 74 allows the blade 90 to rise to energize contacts 77 and 78 and deenergize contact 79. This causes the blowers 33 and 34 to stop, and causes motor compressor 60 to operate and heater 100 to be energized. The bypass valve 92 is opened and hot refrigerant is delivered to the evaporator portions 31 and 32 through bypass 97. This melts the frost on the portions 31 and 32. The water thus formed flows down trough 105 and back wall 107 as well as down passage 110 and opening 111, and through pipe 113 to evaporating pan 114 where it is eventually evaporated by heat from condenser 61. When the timer notch 74 moves beyond blade 90, the refrigeration cycle is restored.

In the modification shown in Figures 13 and 14, the refrigeration cycle is substantially the same as in Figures 1 to 12. The defrost cycle differs in that the motor compressor 60 is stopped, as well as the fans 33 and 36, while the heater 160 is energized directly to melt the frost.

If desired, in any or all embodiments, insulation may be placed between any or all of the walls of the compartment 21 and the evaporator which is adjacent it. For example, a sleeve 200 of insulation may be placed around the liner 120 in Figure 3 to reduce the direct heat exchange between compartment 21 and evaporator 31. Also, insulation 201, in Figure 5, may be placed between the liner wall 202 and evaporator 32 to reduce the direct heat exchange in that area. The insulation may be made of polystyrene, if desired. The purpose of the insulation is to permit sufficient rise in temperature in the air circulated within compartment 21 as compared to the temperature of the air circulated adjacent the evaporator, to reduce the relative humidity within the compartment 21 to a degree sufficient to sublimate all frost within the compartment 21 and to prevent deposit of frost therein.

While the forms of embodiment of the invention as herein disclosed constitutes a preferred form, it is to be understood that other forms might be adopted as may come within the scope of the claims which follow.

What is claimed is as follows:

1. In combination: a refrigerator having means forming a first compartment to be maintained at a temperature below 32° F. and a second compartment to be maintained at a refrigerating temperature above 32° F., a casing surrounding a major portion of said first compartment and having an air inlet into and an air outlet from said first compartment; a refrigerating system having a refrigerant liquefier and a refrigerant evaporator, one portion of said evaporator surrounding said casing and another portion of said evaporator being relatively remote from said casing; a first fan for circulating air from said air outlet past said one portion of said evaporator, through said air inlet into said first compartment and into said air outlet for recirculation by said first fan; and a second fan for recirculating air back and forth between said second compartment and said another portion of said evaporator.

2. In combination: a refrigerator having means forming a first compartment to be maintained at a temperature below 32° F. and a second compartment to be maintained at a refrigerating temperature above 32° F., a casing surrounding a major portion of said first compartment and having an air inlet into and an air outlet from said first compartment; a refrigerating system having a refrigerant liquefier and a refrigerant evaporator, one portion of said evaporator surrounding said casing and another portion of said evaporator being relatively remote from said casing; a first fan for circulating air from said air outlet past said one portion of said evaporator, through said air inlet, into said first compartment and into said air outlet for recirculation by said first fan; and said second compartment and said another portion of said evaporator being in thermal exchange independently of said recirculation by said first fan.

3. In combination: a refrigerator having means forming a first compartment to be maintained at a temperature below 32° F. and a second compartment to be maintained at a refrigerating temperature above 32° F., a casing surrounding a major portion of said first compartment and having an air inlet into and an air outlet from said first compartment; a refrigerating system having a refrigerant liquefier and a refrigerant evaporator, one portion of said evaporator surrounding said casing and another portion of said evaporator being relatively remote from said casing; a first fan for circulating air from said air outlet past said one portion of said evaporator, through said air inlet, into said first compartment and into said air outlet for recirculation by said first fan; said second compartment and said another portion of said evaporator being in thermal exchange independently of said recirculation by said first fan; means for maintaining the temperature of the refrigerant in said one portion of said evaporator between predetermined limits during the refrigeration period; and means adjustably to produce thermal exchange between said another portion of said evaporator and said second compartment.

4. In combination: a refrigerator having means forming a first compartment to be maintained at a temperature below 32° F. and a second compartment to be maintained at a refrigerating temperature above 32° F., a casing surrounding a major portion of said first compartment and having an air inlet into and an air outlet from said first compartment; a refrigerating system having a refrigerant liquefier and a refrigerant evaporator, one portion of said evaporator surrounding said casing and another portion of said evaporator being relatively remote from said casing; a first fan for circulating air from said air outlet past said one portion of said evaporator, through said air inlet, into said first compartment and into said air outlet for recirculation by said first fan; said second compartment and said another portion of said evaporator being in thermal exchange independently of said recirculation by said first fan; means for maintaining the temperature of the refrigerant in said one portion of said evaporator between predetermined limits during the refrigeration period; and means adjustably to produce thermal exchange between said another portion of said evaporator and second compartment in response to temperatures in said second compartment.

5. In combination: a refrigerator having means forming a first compartment to be maintained at a temperature below 32° F. and a second compartment to be maintained at a refrigerating temperature above 32° F., a casing surrounding a major portion of said first compartment and having an air inlet into and an air outlet from said first compartment; a refrigerating system having a refrigerant liquefier and refrigerant evaporator means arranged to cool said compartment, air circulating means for causing circulation of air from said air outlet past said one portion of said evaporator means through said air inlet, into said first compartment and into said outlet for recirculation; said air outlet being disposed adjacent the front portion of said first compartment.

6. In combination: a refrigerator having means forming a first compartment to be maintained at a temperature below 32° F. and a second compartment to be maintained at a refrigerating temperature above 32° F.; a refrigerating system having a refrigerant liquefier and a refrigerant evaporator, one portion of said evaporator being disposed outside of said first compartment and another portion of said evaporator being for thermal exchange with said second compartment; first adjustable means for adjustably causing thermal exchange between said one portion of said evaporator and said first compartment; and second independently adjustable means for adjustably causing thermal exchange between said another portion of said evaporator with said second compartment.

7. In combination: a refrigerator having means forming a first compartment to be maintained at a temperature below 32° F. and a second compartment to be maintained at a refrigerating temperature above 32° F.; a refrigerating system having a refrigerant liquefier and a refrigerant evaporator, one portion of said evaporator being disposed outside of said first compartment and another portion of said evaporator being for thermal exchange with said second compartment; first adjustable means for adjustably causing thermal exchange between said one portion of said evaporator and said first compartment; and second independently adjustable means for adjustably causing thermal exchange between said another portion of said evaporator with said second compartment in response to temperatures in said second compartment.

8. In combination: a refrigerator having means forming a first compartment to be maintained at a temperature below 32° F. and a second compartment to be maintained at a refrigerating temperature above 32° F. a casing surrounding a major portion of said first compartment and having an air inlet into and an air outlet from said first compartment; a refrigerating system having a refrigerant liquefier and a refrigerant evaporator, one portion of said evaporator surrounding said casing and another portion of said evaporator being relatively remote from said casing; a first fan for circulating air from said air outlet past said one portion of said evaporator, through said air inlet, into said first compartment and into said air outlet for recirculation by said first fan; a second fan for recirculating air back and forth between said second compartment and said another portion of said evaporator; and defrosting means causing at least one of said fans to stop circulation and causing high defrosting temperature in said evaporator.

9. In combination: a refrigerator having means forming a first compartment to be maintained at a temperature below 32° F. and a second compartment to be maintained at a refrigerating temperature above 32° F. a casing surrounding a major portion of said first compartment and having an air inlet into and an air outlet from said first compartment; a refrigerating system having a refrigerant liquefier and a refrigerant evaporator, one portion of said evaporator surrounding said casing and another portion of said evaporator being relatively remote from said casing; a first fan for circulating air from said air outlet past said one portion of said evaporator, through said air inlet, into said first compartment and into said air outlet for recirculation by said first fan; a second fan for recirculating air back and forth between said second compartment and said another portion of said evaporator; and defrosting means causing at least one of said fans to stop circulation and causing high defrosting temperature in said evaporator; and means for evaporating the moisture produced during the operation of said defrosting means.

10. A unitary refrigerator comprising: a first liner forming below 32° F. refrigerating compartment and having air flow inlet means into an air flow outlet means out of said compartment; a casing surrounding a major portion of said first liner and forming an air flow and air cooling passageway surrounding said first liner and being connected to said air flow inlet means and said air flow outlet means; a refrigerating system having a refrigerant liquefier and a refrigerant evaporator, at least a portion of said evaporator being located in said air cooling passageway and spaced from said liner and cooling air flowing through said passageway; a second liner forming an above 32° F. refrigerating compartment; and means to maintain thermal exchange between at least a portion of said evaporator and said above 32° F. refrigerating compartment at a rate to maintain food preserving refrigerating temperatures above 32° F.

11. A unitary refrigerator comprising: a first liner forming below 32° F. refrigerating compartment and having air flow inlet means into and air flow outlet means out of said compartment; a casing surrounding a major portion of said first liner and forming an air flow and air cooling passageway surrounding said first liner and being connected to said air flow inlet means and said air flow outlet means; air forcing means for circulating air back and forth between said passageway and said below 32° F. refrigerating compartment through said air flow inlet means and said air flow outlet means; a refrigerating system having a refrigerant liquefier and a refrigerant evaporator, at least a portion of said evaporator being spaced from said liner and cooling air flowing through said passageway; a second liner forming an above 32° F. refrigerating compartment; a casing cooperating with said liner and forming a second passageway near said liner and being connected therewith at an air inlet into and an air outlet from said above 32° F. refrigerating compartment, and a portion of said evaporator being in thermal exchange with said second passageway; and second air forcing means for circulating air back and forth between said second passageway and said above 32° F. refrigerating compartment.

12. In combination: a refrigerator having means forming a first compartment to be maintained at a temperature below 32° F. and a second compartment to be maintained at a refrigerating temperature above 32° F.; a casing surrounding a major portion of said first compartment and having an air inlet into and an air outlet from said first compartment; a refrigerating system having a refrigerant liquefier and a refrigerant evaporator, one portion of said evaporator surrounding said casing and another portion of said evaporator being relatively remote from said casing; a first fan for circulating air from said air outlet past said one portion of said evaporator, through said air inlet, into said first compartment and into said air outlet for recirculation by said first fan; a second fan for recirculating air back and forth between said second compartment and said another portion of said evaporator; and means for maintaining said one portion of said evaporator between predetermined temperature limits during refrigerating conditions.

13. In combination: a refrigerator having means forming a first compartment to be maintained at a temperature below 32° F. and a second compartment to be maintained at a refrigerating temperature above 32° F.; a casing surrounding a major portion of said first compartment and having an air inlet into and an air outlet from said first compartment; a refrigerating system having a refrigerant liquefier and a refrigerant evaporator, one portion of said evaporator surrounding said casing and another portion of said evaporator being relatively remote from said casing; a first fan for circulating air from said air outlet past said one portion of said evaporator, through said air inlet, into said first compartment and into said air outlet for recirculation by said first fan; a second fan for recirculating air back and forth between said second compartment and said another portion of said evaporator; and means for controlling operation of said second fan in response to temperatures in said second compartment.

14. In combination: a refrigerator having means forming a first compartment to be maintained at a temperature below 32° F. and a second compartment to be maintained at a refrigerating temperature above 32° F.; a casing surrounding a major portion of said first compartment and having an air inlet into and an air outlet from said first compartment; a refrigerating system having a refrigerant liquefier and a refrigerant evaporator, one portion of said evaporator surrounding said casing and another portion of said evaporator being relatively remote from said casing; a first fan for circulating air from said air outlet past said one portion of said evaporator, through said air inlet, into said first compartment and into said air outlet for recirculation by said first fan; a second fan for recirculating air back and forth between said second compartment and said another portion of said evaporator; means for maintaining said one portion of said evaporator between predetermined temperature limits during refrigerating conditions; and means for controlling operation of said second fan in response to temperatures in said second compartment.

15. A unitary refrigerator comprising: a first liner forming below 32° F. refrigerating compartment and having air flow inlet means into and air flow outlet means out of said compartment; a casing surrounding a major portion of said first liner and forming an air flow and air cooling passageway surrounding said first liner and being connected to said air flow inlet means and said air flow outlet means; air forcing means for circulating air back and forth between said passageway and said below 32° F. refrigerating compartment through said air flow inlet means and said air flow outlet means; a refrigerating system having a refrigerant liquefier and a refrigerant evaporator, at least a portion of said evaporator being spaced from said liner and cooling air flowing through said passageway; a second liner forming an above 32° F. refrigerating compartment; a casing cooperating with said liner and forming a second passageway near said liner and being connected therewith at an air inlet into and an air outlet from said above 32° F. refrigerating compartment, and a portion of said evaporator being in thermal exchange with said second passageway; second air forcing means for circulating air back and forth between said second passageway and said above 32° F. refrigerating compartment and for cooling said air by said last named portion of said evaporator; means for maintaining said evaporator at a temperature below 32° F. and below the temperature to be maintained in said below 32° F. refrigerating compartment to prevent deposit of frost in and to sublime any frost from said below 32° F. refrigerating compartment.

16. A unitary refrigerator comprising: a first liner forming below 32° F. refrigerating compartment and having air flow inlet means into and air flow outlet means out of said compartment; a casing surrounding a major portion of said first liner and forming an air flow and air cooling passageway surrounding said first liner and being connected to said air flow inlet means and said air flow outlet means; air forcing means for circulating air back and forth between said passageway and said below 32° F. refrigerating compartment through said air flow inlet means and said air flow outlet means; a refrigerating system having a refrigerant liquefier and a refrigerant evaporator, at least a portion of said evaporator being spaced from said liner and cooling air flowing through said passageway; a second liner forming an above 32° F. refrigerating compartment; a casing cooperating with said liner and forming a second passageway near said liner and being connected therewith at an air inlet into and an air outlet from said above 32° F. refrigerating compartment, and a portion of said evaporator being in thermal exchange with said second passageway; second air forcing means for circulating air back and forth between said second passageway and said above 32° F. refrigerating compartment and for cooling said air by said last named portion of said evaporator; means for maintaining said evaporator at a temperature below 32° F. and below the temperature to be maintained in said below 32° F. refrigerating compartment to prevent deposit of frost in and to sublime any frost from said below 32° F. refrigerating compartment; and means to regulate the circulation of air through said second passageway and said above 32° F. refrigerating compartment to maintain a predetermined range of refrigerating temperature above 32° F. in said last named compartment.

17. A unitary refrigerator comprising: a first liner forming below 32° F. refrigerating compartment and having air flow inlet means into and air flow outlet means out of said compartment; a casing surrounding a major portion of said first liner and forming an air flow and air cooling passageway surrounding said first liner and being connected to said air flow inlet means and said air flow outlet means; air forcing means for circulating air back and forth between said passageway and said below 32° F. refrigerating compartment through said air flow inlet means and said air flow outlet means; a refrigerating system having a refrigerant liquefier and a refrigerant evaporator, at least a portion of said evaporator being spaced from said liner and cooling air flowing through said passageway; a second liner forming an above 32° F. refrigerating compartment; a casing cooperating with said liner and forming a second passageway near said liner and being connected therewith at an air inlet into and an air outlet from said above 32° F. refrigerating compartment, and a portion of said evaporator being in thermal exchange with said second passageway; second air forcing means for circulating air back and forth between said second passageway and said above 32° F. refrigerating compartment and for cooling said air by said last named portion of said evaporator; means for maintaining said evaporator at a temperature below 32° F. and below the temperature to be maintained in said below 32° F. refrigerating compartment to prevent deposit of frost in and to sublime any frost from said below 32° F. refrigerating compartment; and means to adjust the temperature to be maintained in said evaporator.

18. A unitary refrigerator comprising: a first liner forming below 32° F. refrigerating compartment and having air flow inlet means into and air flow outlet means out of said compartment; a casing surrounding a major portion of said first liner and forming an air flow and air cooling passageway surrounding said first liner and being connected to said air flow inlet means and said air flow outlet means; air forcing means for circulating air back and forth between said passageway and said below 32° F. refrigerating compartment through said air flow inlet means and said air flow outlet means; a refrigerating system having a refrigerant liquefier and a refrigerant evaporator, at least a portion of said evaporator being spaced from said liner and cooling air flowing through said passageway; a second liner forming an above 32° F. refrigerating compartment; a casing cooperating with said liner and forming a second passageway near said liner and being connected therewith at an air inlet into and an air outlet from said above 32° F. refrigerating compartment, and a portion of said evaporator being in thermal exchange with said second passageway; second air forcing means for circulating air back and forth between said second passageway and said above 32° F. refrigerating compartment and for cooling said air by said last named portion of said evaporator; means for maintaining said evaporator at a temperature below 32° F. and below the temperature to be maintained in said below 32° F. refrigerating compartment to prevent deposit of frost in and to sublime any frost from said below 32° F. refrigerating compartment; means to adjust the temperature to be maintained in said evaporator; and means to adjust said predetermined range of refrigerating temperature independently of the adjustment of the temperature to be maintained in said evaporator.

19. A self-contained household refrigerator having means forming a first compartment to be maintained at temperatures below 32° F. and a second compartment separate from the first compartment to be maintained at refrigerating temperatures above 32° F., said compartments being located one above the other, said first compartment having an air inlet and an air discharge outlet and a first air duct arrangement connecting with said inlet and outlet to form a first air circuit, a refrigerating system having a refrigerant liquefier and a refrigerant evaporator, one portion of said evaporator extending into heat exchange relation with said first air circuit outside of said compartment and another portion of said evaporator being relatively remote from said first air circuit, a first fan for circulating air through said first air circuit from said air outlet in heat transfer relation with said one portion of said evaporator and through said air inlet into and through said first compartment to said air outlet for recirculation by said first fan, a second air duct arrangement sealed from said first compartment and first air duct arrangement and having inlet and outlet connections with said second compartment forming a second air circuit sealed from the first air circuit, said another portion of said evaporator being located out of heat transfer relationship with said first air circuit and in heat transfer relationship with said second air circuit, a second fan for recirculating air through said second air circuit including said second compartment and in heat transfer relation with said another portion of said evaporator.

20. A household refrigerator having means forming a first compartment to be maintained at temperatures below 32° F. and a second compartment separate from the first compartment to be maintained at refrigerating temperatures above 32° F., casing means for said first compartment having an air inlet to and an air discharge outlet from said first compartment and an air duct arrangement connecting with said inlet and outlet to form a first air circuit, a refrigerating system having a refrigerant liquefier and a refrigerant evaporator having series connected portions with substantially unrestricted connections, the initial portion of said evaporator being located in said first air duct arrangement and a following portion of said evaporator being relatively remote from said first compartment and said first air circuit, a first fan for circulating air through said first air circuit from said air outlet in heat transfer relation with said initial portion of said evaporator and through said air inlet into and through said first compartment to said air outlet for recirculation by said first fan, a second air duct arrangement having an air inlet and an air outlet connecting to said second compartment forming a second air circuit separate and independent from the first air circuit, said following portion of said evaporator being in heat transfer relation with said second air circuit, a second fan for recirculating air through said second air circuit including said second duct arrangement and said second compartment and in heat transfer relation with said another portion of said evaporator, and means including a thermostat bulb in heat transfer relation with said following evaporator portion for cycling said liquefier to control the temperatures of said evaporator.

21. A self-contained household refrigerator having means forming a first compartment to be maintained at temperatures below 32° F. and a second compartment separate from the first compartment to be maintained at refrigerating temperatures above 32° F., said compartments being located one above the other, said first compartment having an air inlet and an air discharge outlet and a first air duct arrangement connecting with said inlet and outlet to form a first air circuit, a refrigerating system having a refrigerant liquefier and a refrigerant evaporator, one portion of said evaporator extending into heat exchange relation with said first air circuit outside of said compartment and another portion of said evaporator being relatively remote from said first air circuit and said casing, a first fan for circulating air through said first air circuit from said air outlet in heat transfer relation with said one portion of said evaporator and through said air inlet into and through said first compartment to said air outlet for recirculation by said first fan, a second air duct arrangement sealed from said first compartment and first air duct arrangement and having inlet and outlet connections with said second compartment forming a second air circuit sealed from the first air circuit, said another portion of said evaporator being located out of heat transfer relationship with said first air circuit and in heat transfer relationship with said second air circuit, a second fan for recirculating air through said second air circuit including said second compartment and in heat transfer relation with said another portion of said evaporator, a first thermostatic control means responsive to the temperature of the air in said second air circuit for controlling the operation of said second fan, and a second thermostatic control means responsive to the temperature of said another portion of said evaporator for controlling said refrigerant liquefier.

References Cited in the file of this patent

UNITED STATES PATENTS

| | | |
|---|---|---|
| 2,133,956 | Buchanan | Oct. 25, 1938 |
| 2,576,665 | Bixler | Nov. 27, 1951 |
| 2,593,370 | Warren | Apr. 15, 1952 |
| 2,801,525 | Bixler | Aug. 6, 1957 |